(12) United States Patent
Thompson

(10) Patent No.: US 7,085,844 B2
(45) Date of Patent: Aug. 1, 2006

(54) METHOD AND APPARATUS FOR RANDOM PLAY TECHNOLOGY

(76) Inventor: Kerry A. Thompson, 1109 E. 38th Pl., Tulsa, OK (US) 74105

(*) Notice: Subject to any disclaimer, the term of this patent is extended or adjusted under 35 U.S.C. 154(b) by 1072 days.

(21) Appl. No.: 09/943,950

(22) Filed: Aug. 31, 2001

(65) Prior Publication Data
US 2003/0046638 A1    Mar. 6, 2003

(51) Int. Cl.
*G06F 17/30* (2006.01)
(52) U.S. Cl. .................. 709/231; 715/500; 463/43; 707/102; 725/86
(58) Field of Classification Search ............... 709/231; 715/500; 707/102; 725/86; 463/43
See application file for complete search history.

(56) References Cited

U.S. PATENT DOCUMENTS

| 4,792,934 | A |   | 12/1988 | Masaki |
|---|---|---|---|---|
| 5,241,671 | A |   | 8/1993 | Reed et al. ............. 395/600 |
| 5,379,422 | A |   | 1/1995 | Antoshenkov ........... 395/600 |
| 5,424,770 | A | * | 6/1995 | Schmelzer et al. ......... 725/36 |
| 5,428,774 | A |   | 6/1995 | Takahashi et al. ........ 395/600 |
| 5,467,288 | A |   | 11/1995 | Fasciano et al. ........ 364/514 R |
| 5,524,193 | A |   | 6/1996 | Covington et al. ........ 395/154 |
| 5,535,063 | A |   | 7/1996 | Lamming ................ 360/4 |
| 5,537,528 | A |   | 7/1996 | Takahashi et al. ........ 395/154 |
| 5,708,845 | A |   | 1/1998 | Wistendahl et al. ....... 395/806 |
| 5,742,283 | A |   | 4/1998 | Kim ...................... 345/302 |
| 5,752,029 | A |   | 5/1998 | Wissner .................. 395/615 |
| 5,986,200 | A |   | 11/1999 | Curtin |
| 6,012,064 | A |   | 1/2000 | Gibbons et al. .......... 707/103 |
| 6,072,934 | A |   | 6/2000 | Abecassis |
| 6,075,551 | A | * | 6/2000 | Berezowski et al. ....... 725/36 |
| 6,079,566 | A |   | 6/2000 | Eleftheriadis et al. .... 207/101 |
| 6,084,581 | A |   | 7/2000 | Hunt ...................... 345/302 |
| 6,144,375 | A |   | 11/2000 | Jain et al. ............... 345/302 |
| 6,166,735 | A |   | 12/2000 | Dom et al. .............. 345/339 |
| 6,175,840 | B1 |   | 1/2001 | Chen et al. .............. 707/501 |
| 6,189,005 | B1 |   | 2/2001 | Chakrabarti et al. ........ 707/6 |
| 6,944,585 | B1 | * | 9/2005 | Pawson ................... 703/22 |
| 2002/0065678 | A1 | * | 5/2002 | Peliotis et al. ............ 705/1 |
| 2003/0037329 | A1 | * | 2/2003 | Piotrowski et al. ........ 725/28 |
| 2003/0067554 | A1 | * | 4/2003 | Klarfeld et al. .......... 348/461 |
| 2004/0027369 | A1 | * | 2/2004 | Kellock et al. .......... 345/716 |

* cited by examiner

*Primary Examiner*—Dung Dinh
(74) *Attorney, Agent, or Firm*—Fellers, Snider, Blankenship, Bailey & Tippens, P.C.; Terry L. Watt (57) ABSTRACT

In accordance with a preferred embodiment of the instant invention, there is provided a method and apparatus for enhancing the value of prerecorded works such as movies and music, as well as computer games, by randomly choosing alternative content segments at different points within the work, thereby potentially offering the user a different experience each time the work is played. This invention is suitable for use with specially prepared music, movies, videos, computer games and the like, wherein a plurality of interchangeable parallel or sequential content segments are specified. At each time point where such content segments are specified, the instant method selects randomly from them for presentation to the user.

17 Claims, 4 Drawing Sheets

METHOD AND APPARATUS FOR RANDOM PLAY TECHNOLOGY

FIELD OF THE INVENTION

The present invention relates generally to methods and apparatus for the display of movies, music, videos, television programming, and the like. Additionally, it pertains to computer gaming and other activities that heretofore have been experienced in linear start-to-finish fashion. The instant invention pertains to the delivery of music, videos, movies, and games, etc. to an end user.

BACKGROUND OF THE INVENTION

It is well known that all forms of digital entertainment are experiencing an explosive growth in popularity. Whether it takes the form of music, video, games, etc., the demand is growing and is not likely to reach a peak at any time soon.

Of course, the buying public demands value for its dollar. Thus, there is constant pressure on sellers to find ways of enhancing the value of their products. However, there is a fundamental limitation with most of these sorts of products: they offer only one "version." That is, once a conventional music CD has been played, it will forever thereafter yield the same listening experience: each tune will be heard from start to finish in exactly the same sequence. Similarly, once a movie has been viewed, it will subsequently yield the same viewing experience each time, i.e., the plot moves along a linear path and repeat viewings will always yield the same sequence of scenes and events. This property tends to limit replay value of linearly performed works such as music movies, and videos and, hence, limits the value these sorts of products might have to the consumer as is reflected in the amount that the seller can expect to charge.

Those of ordinary skill in the art will know that this problem has certainly been recognized previously and that considerable effort has been expended in making these sorts of products "interactive" in order to increase their appeal to the buying public. For example, DVD movies now allow the user to selectively view different linear segments (or choose a viewing position) under direct control of the user. Similarly, it is relatively common to find that audio CD's might offer alternative mixes of the same musical work which can be selected under the direction of the user. Finally, in the case of computer games, it has long been the practice to provide for "random events" within the program which are presented to the user in an unpredictable fashion. However, even in this case the underlying story moves along in a linear fashion and the user is only temporarily inconvenienced (or assisted in some cases) by these random events.

Of course, the common element in all of the foregoing is that in the past the focus has been on providing the user with the capability of adjusting the listening/viewing experience to suit his or her taste. In each case, it is the user that ultimately controls the end result and, as a consequence, the user is never really "surprised" by the product, originating as it does in his or her own preferences.

Heretofore, as is well known in the music and video arts, there has been a need for an invention to address and solve the above-described problems. Accordingly, it should now be recognized, as was recognized by the present inventor, that there exists, and has existed for some time, a very real need for a method and apparatus that would address and solve the above-described problems.

Before proceeding to a description of the present invention, however, it should be noted and remembered that the description of the invention which follows, together with the accompanying drawings, should not be construed as limiting the invention to the examples (or preferred embodiments) shown and described. This is so because those skilled in the art to which the invention pertains will be able to devise other forms of this invention within the ambit of the appended claims.

SUMMARY OF THE INVENTION

In accordance with a preferred embodiment of the instant invention, there is provided a method and apparatus for enhancing the value of prerecorded works such as movies, music, video, and television programming, as well as computer games. In brief, the instant invention operates to enhance a user's viewing/listening experience of a particular work by randomly substituting alternative content segments at fixed locations within the work. At each such fixed location, the candidate content segments for that location will be specially selected and prepared so as to be interchangeable. Thus, each time the work is played/experienced, the user will likely see a different combination of the interchangeable segments, thereby prolonging the novelty of the purchased work.

Thus, and according to a preferred embodiment, there is provided a new and useful improvement in the technology of delivering music, movies, video, and games to end-users which helps maximize the entertainment value of such a work by randomly selecting among alternative segments at different points during the playback. In more particular, the instant invention is designed to operate on a base work such as movie, video, musical work, etc., which has been specially prepared to include a plurality of alternative parallel or sequential content segments which are designed to be interchangeable. Each of these segments is associated with at least one particular randomization point in the work. At each such randomization point, one of the plurality of assigned content segments is randomly selected for presentation to the user. Subsequent playing of the work will potentially yield a different selection at each randomization point, so that the net result is that successive replays will yield a different user experience.

Through the smooth incorporation of such randomized selections into the underlying work, it is possible to a create a viewing/playing experience that varies each time the work is played, thereby, causing the user to maintain a higher degree of interest in the work over time than would otherwise be the case.

The foregoing has outlined in broad terms the more important features of the invention disclosed herein so that the detailed description that follows may be more clearly understood, and so that the contribution of the instant inventors to the art may be better appreciated. The instant invention is not to be limited in its application to the details of the construction and to the arrangements of the components set forth in the following description or illustrated in the drawings. Rather, the invention is capable of other embodiments and of being practiced and carried out in various other ways not specifically enumerated herein. Further, the disclosure that follows is intended to be pertinent to all alternatives, modifications and equivalents as may be included within the spirit and scope of the invention as defined by the appended claims. Finally, it should be understood that the phraseology and terminology employed herein are for the purpose of description and should not be regarded as limiting, unless the specification specifically so limits the invention.

While the instant invention will be described in connection with a preferred embodiment, it will be understood that it is not intended to limit the invention to that embodiment. On the contrary, it is intended to cover all alternatives, modifications and equivalents as may be included within the spirit and scope of the invention as defined by the appended claims.

BRIEF DESCRIPTION OF THE DRAWINGS

Other objects and advantages of the invention will become apparent upon reading the following detailed description and upon reference to the drawings in which.

DETAILED DESCRIPTION OF THE INVENTION

General Environment of the Invention

Figure 1:
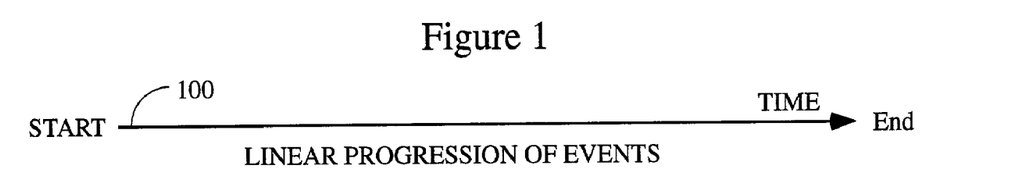
FIG. 1 illustrates how conventional audio and video works are experienced.

Turning first to FIG. 1, wherein a typical prior art arrangement is illustrated, in a conventional piece of music, a movie, a game, or the like, it is customary to have the events move smoothly from start to finish along what is essentially a linear time/content path 100. For example, when a music CD is played, the music starts at the first cut on the CD and each note/sound in the work is played sequentially until the end of the recorded music is reached. Similarly, in a conventional movie, the work is viewed in a linear fashion from start to end: each movie frame, each scene, etc., is viewed in an unalterable sequence that was intended by the director or producer. Also, computer games tend to have this same structure. That is, the user starts in some predetermined setting and then progresses through the game toward the conclusion, reacting to each new challenge as it is presented and not being able to progress until each such challenge is overcome. Of course, the unifying feature of all of these kinds of entertainment is that they are experienced linearly. Even in the case of computer games which present random events to the user, the underlying work is essentially linear, with the user being prevented from progressing until certain events have taken place.

PREFERRED EMBODIMENTS

Figure 5:
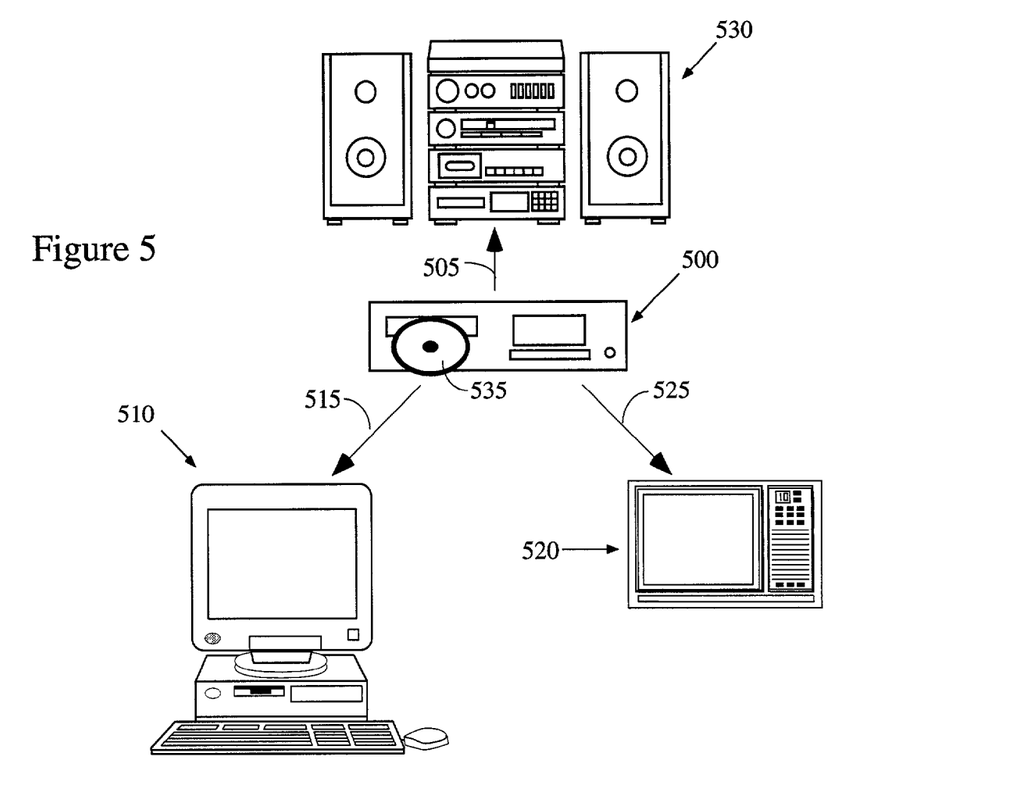
FIG. 5 illustrates the general environment of the instant invention

According to a preferred embodiment of the instant invention, there is provided a method and apparatus for varying this static arrangement of information in a way that will enable the user to derive more enjoyment from his or her entertainment investment. As is generally illustrated in FIG. 5, the instant invention is preferably designed to work with devices such as personal computers 510, televisions 520, and/or audio systems 530, as the user desires. Of course, those of ordinary skill in the art will recognize that the precise means 505, 515, and 525 by which the player 500 is connected to these various devices might differ depending on the application. For example, if the player 500 is connected to a television 520 or entertainment center 530, the connection 505 or 515 might be a simple one-way audio or audio/video connection from the output of the player 500 to the recipient device. In other situations, and especially if the unit 500 is connected to a computer, the connection 515 might be audio, video, serial, parallel, firewire, USB, Ethernet, or any other connection or combination of connections.

Figure 2:
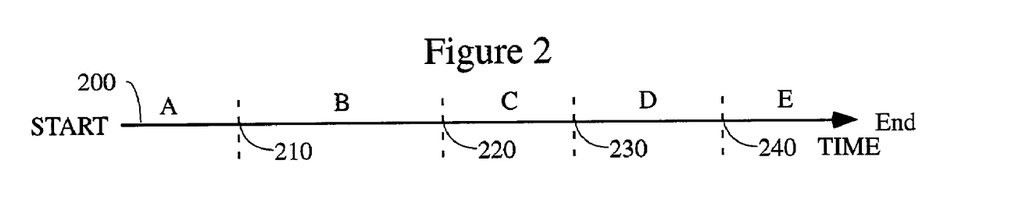
FIG. 2 illustrates how a sequentially viewed work can be subdivided into content segments for purposes of the instant invention.
Figure 3:
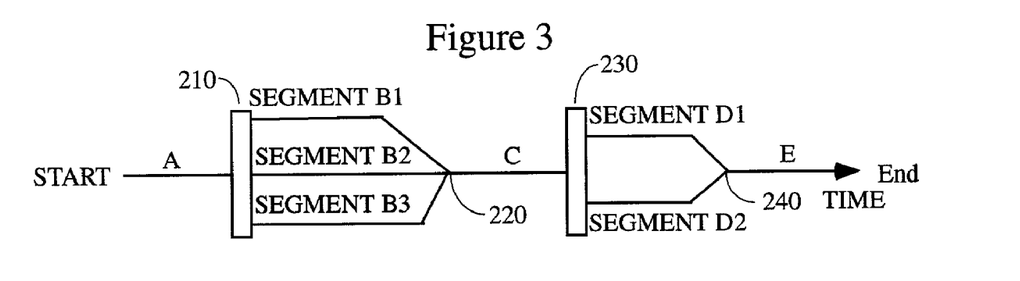
FIG. 3 contains a schematic illustration of a preferred embodiment of the instant invention that utilizes two randomization points.

Turning now to FIGS. 2 and 3, FIG. 2 contains a schematic illustration of a typical linearly performed work such as a movie 200. For purposes of illustration, assume that this work consists of five major content segments, A–E, which are defined by time points 210 through 240. That is, content segment B is defined to begin at time point 210 and end at time point 220. These content segments might be plot elements in the case of a movie (e.g., scenes or acts), musical phrases in the case of a song, or different story elements in a video game, etc. Obviously, there is no specific way that the work 200 need be divided into elements for use with the instant invention. However, for purposes of continuity in the final reassembled and viewed work, one would normally expect that the division points should correspond to natural breaks in the work.

As is illustrated in FIG. 3, the central idea of the instant invention is that it is possible to randomly insert alternative content segments into the work 200 so as to provide a varying user experience each time the work is viewed. Accordingly and by way of example only, assume that the producer/director has three alternative content segments B1–B3 that would be suitable to be randomly inserted when the move 200 reaches time 210. When the playback of this work reaches the randomization point at time 210, the player 500 will be instructed to randomly select from one of the three predefined alternative segments and then smoothly insert the chosen segment into the playback in place of original segment B. Similarly, at time 230, the player will select from one of the two offered alternatives (segment D1 and D2) which are designed to be placed in place of original segment D. Needless to say, one of the substituted segments (D1 or D2) could be the original segment D.

In practice, a player 500 (e.g., a specially programmed DVD or similar player, a specially programmed CD player, or a computer game) will begin presenting the work 200 at its start. The work will then be played linearly until randomizing point 210 is reached. Then, one of a predetermined number of possible content alternatives will be selected (content segments B1, B2, or B3) and played. Note that each of the content segments will be designed to mesh smoothly at time point 220, so that a single thread may be continued after the main path through the work has been resumed. At randomizing point 230, one of two predetermined content segments (D1 or D2) will be randomly selected and presented. The main thread will then be smoothly rejoined at time 240. Additionally, it should be noted that although the instant disclosure might refer to a player 500 that reaches a particular time point and then makes a random choice among the alternatives, in reality the choice would typically be made in advance of the player 500 reaching the randomization point, so that the chosen selection can be buffered for output to the user. This is all well known to those of ordinary skill in the art.

Figure 9:
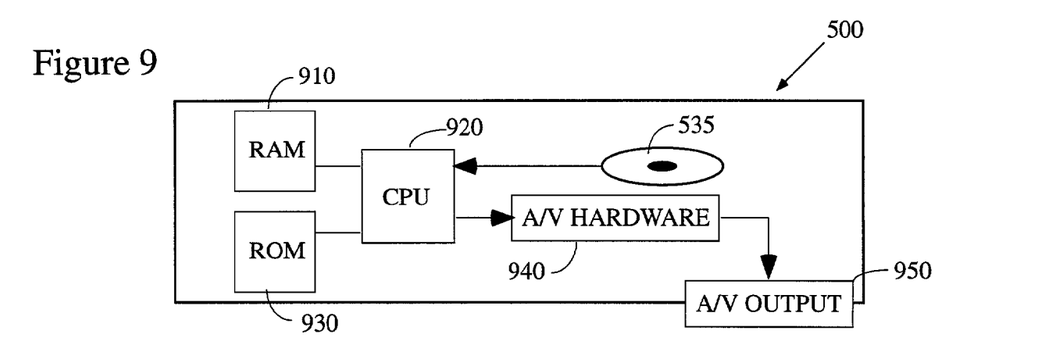
FIG. 9 illustrates a preferred apparatus for playing works that are prepared according to the instant invention.

Turning now to FIG. 9, wherein additional details of a preferred player 500 embodiment are illustrated, CPU 920 will control reading of input media 535. This medium 535 could be CD, DVD, magnetic disk, magnetic tape, magneto-optical disk, RAM, ROM, EPROM, or any other mass storage hardware suitable for holding digital information therein for later recall. Preferably, the recording medium 535 will be a random access device, however that is not strictly required. Through the use of sufficiently large internal buffers (i.e., RAM 910, discussed below) a storage media that can only be sequentially processed could still be used to implement the instant invention. Those skilled in the art will readily recognize how this could be done.

Stored on input medium 535 will preferably be the base work, the alternative content segments, and the logic tree (discussed in more detail hereinafter). Of course, it may be that not all of these items are stored on a single device 535, and it is certainly possible that, for example, the logic tree and/or content segments might be stored separately from the base work (e.g., they might be downloaded from the Internet) and downloaded as needed. In electrical communication with CPU 920 will be some amount of computer RAM 910 and, preferably, some computer ROM 930. The ROM 930 would typically be used to store computer instructions that control the playback of unit 500 according to the scheme of the present invention (e.g., it would preferably contain the program of FIG. 6). The computer RAM 910 could serve many purposes but preferably one of those purposes would be to provide an input buffer for use during playback. That is, it is well known to those of ordinary skill in the art that devices such as player 500 typically contain internal memory into which information is read in advance of the time it is actually needed for output (i.e., it is buffered into memory 910). In the instant case, this RAM buffer 910 will preferably be used to store the base work, together with the selected alternative content segments, in order to create a seamless playback experience. The information read by CPU 920 will subsequently be sent preferably to conventional ANV hardware 940 for conversion to a standard audio and/or video signal for presentation to ANV output interface 950 (e.g., a PC video interface, an RGB connection, or a conventional composite video connection, etc.), from whence it is subsequently received by devices such as a audio unit 530, a television 520, or a computer 510.

As a specific example of how the instant invention would operate in practice, and continuing with the illustration contained in FIG. 3, the instant invention would begin by playing segment A, followed by, say segment B2, followed by segment C, D2, and finally segment E. However, if the work were subsequently played again, a different combination would be expected to be experienced (e.g., A, B1, C, D2, and, E).

Figure 7:
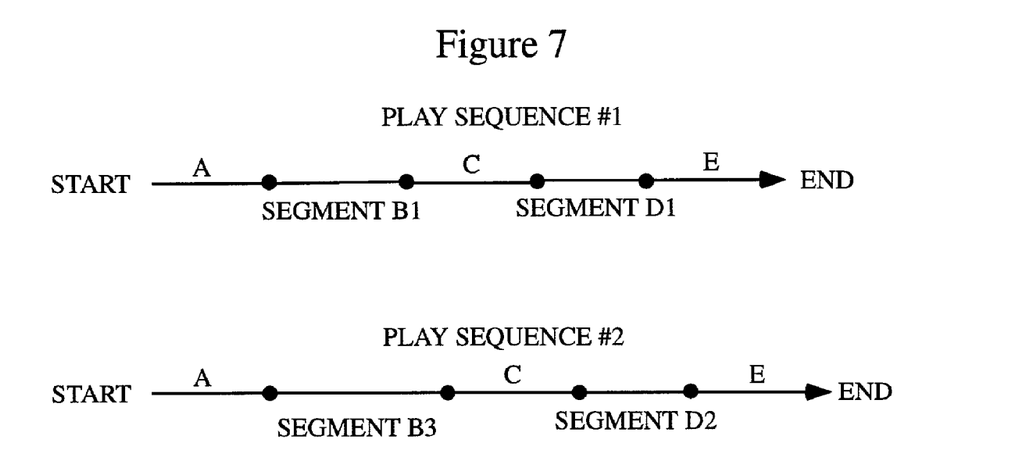
FIG. 7 illustrates some play sequences that could result using the instant invention.

Note that it is not essential that all of the alternative content segments have the same temporal length. FIG. 3 should make it clear that some segments (e.g., segment B2) might be created to be longer than others (segment B1). The net result of including such a shorter segment would be to reduce the playing time of the work. FIG. 7 further illustrates this idea. That is, FIG. 7 contains two randomly selected play sequences (Sequence #1 and #2) which have been constructed from the content segments presented in FIG. 3. The second play sequence is longer by virtue of the fact that random selection has included two longer segments therein. Thus, it should be clear that the methods contemplated by the instant invention could result in works that are different lengths. Indeed, in the extreme case one of the content segment alternatives may have "zero" length, i.e., if this content segment is selected the player will immediately move on to the next segment.

Of course, there is no reason that the start of the work itself might not be subject to randomization, i.e., a randomization point might be included at the start of the work. Those of ordinary skill in the art will immediately perceive how this might be done.

Figure 4:
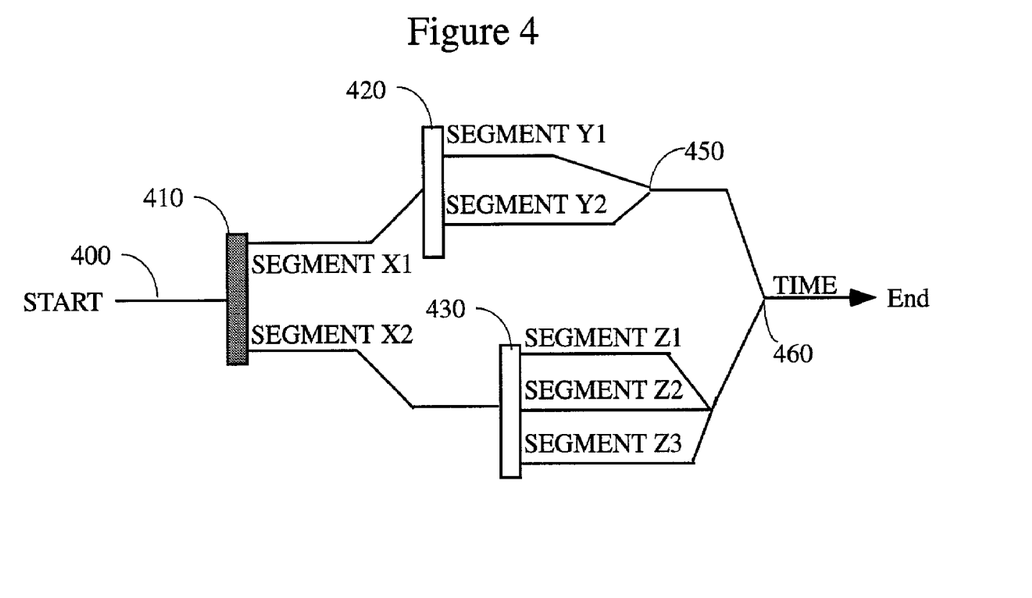
FIG. 4 illustrates a preferred embodiment that combines a user selection with two randomization points.

By way of a more complicated situation, the schematic of FIG. 4 illustrates an arrangement wherein the user makes an initial choice at decision block 410 which, for purposes of this particular example, is not a random choice, but one completely at the discretion of the user. Given the initial choice of segment X1 or X2, the player plays that content segment and then moves through the work along one of two separate paths until it encounters either point 420 or 430, which are each treated as has been discussed previously. At time point 460, the two divergent paths are preferably rejoined, although that is not actually necessary and, in the alternative, the user's initial selection might determine one of two or more mutually exclusive outcomes.

One example situation in which the arrangement of FIG. 4 would be particularly useful would be a computer game, wherein the user decides at the outset whether he or she will play as a "good" character or an "evil" character. The events that follow within the game will all depend on that initial choice, but within the path associated with each such choice the events will be varied thereafter at different random points within the story by the randomizing procedure described previously.

Further examples of how this technology could be applied include the following. In the field of music, each alternative content segment could be a different mix of the same song or each could be taken from a different live recording of the same musical work, etc. In the movie/video field, each content segment might be a different cut or version of the same scene. Many other variations are possible and well within the capabilities of one of ordinary skill in the art to devise.

It should be noted that it might be necessary to modify conventional CD and DVD players to incorporate this technology, preferably by changing the programming that is present within their on-board firmware. Alternatively, in the event that the CD or DVD player has been designed to run software that has been stored on the CD/DVD or elsewhere, the necessary instruction may be uploaded into the player for execution during the playback. Alternatively, any CD or DVD player that can be controlled externally could be used in conjunction with a computer that has been appropriately programmed to randomly access and display, for example, different chapters stored on the DVD for presentation to the user in the order determined according to the programming.

In a preferred embodiment, a specially prepared disk would be inserted into such a modified player. The player (whether CD or DVD) would sense that the inserted disk is of the sort that is designed for random play. Then, according to the randomization points, alternative content segments, and joining points specified by the programmer, the disk would be played according to the previous description. Obviously, such random switching of story paths could easily be implemented within a conventional computer game program by so-programming it.

Figure 6:
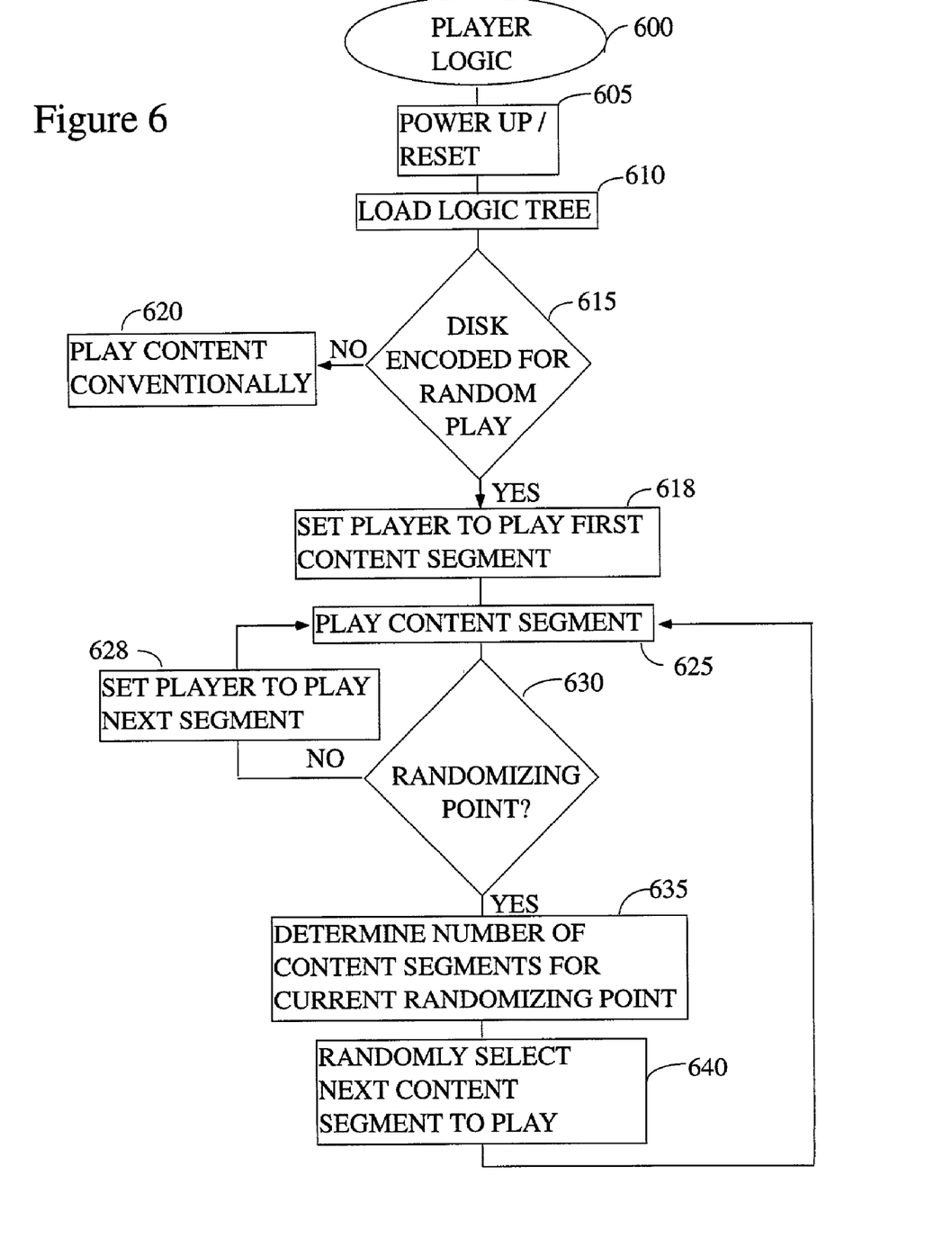
FIG. 6 contains a flow chart that illustrates a preferred player logic.
Figure 8:
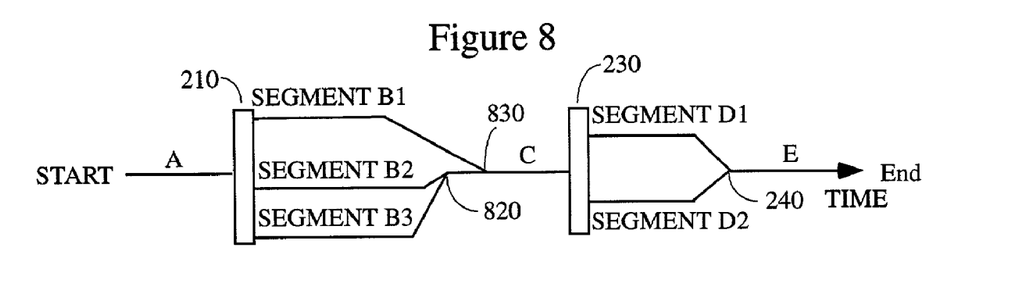
FIG. 8 contains a schematic illustration of another preferred embodiment of the instant invention, wherein the content segments rejoin the underlying work at different times.

FIG. 6 illustrates a typical player control logic 600 that would be suitable for use with the instant invention. As can be seen there, at power up 605 or reset, the player 500 would usually initialize various program variables and a load logic tree 610 in preparation to play the work that will next be presented. In the preferred embodiment, the logic tree that is loaded at step 610 is one that has been defined for a particular base work and would typically contain information such as that which is graphically illustrated in FIGS. 3, 4, and 8, e.g., information such as the time/frame location of the randomization points and pointers to where each of the content segments is stored (e.g., a file name or record identification number within a file, etc.). Further, the logic tree might also include additional information such as the running time for the base work, the length of each of the content segments, the algorithm which is to be used in selecting among the alternative content segments, etc. Of course, the initialization step 610 would typically be performed each time a new work is inserted, etc.

As a next preferred step, the player will determine whether or not the digital work that has been presented is encoded for random play 615 according to the instant invention. If it is determined that the work is not so encoded, it will be played conventionally 620. However, in the case that the proper encoding is present, the logic will typically instruct the player to begin displaying the work at the first content segment 618. Of course, and has been discussed previously, rather than automatically playing the first segment, it may be in some instances that the encoded work will contain multiple "first" segments that are to be selected between, either by the user or via randomization.

Given the first segment to play, the player will then play that information 618. At the end of the first segment, the player will determine whether another randomization point has been reached 630. If not, the program would typically play the next content segment in sequence 628. However, if a randomization point has been reached, the player would typically determine the number of alternative content segments 635 and then choose randomly from among them 640. After the content segment has been selected, it will be played 625 and the process repeated.

It should be noted that although the preferred embodiment utilizes simple random sampling of the content segments, i.e., content segments are randomly selected from among the available alternatives according to a uniform random variable (i.e., each alternative will be equally likely to be selected), it is certainly possible that alternative schemes could be utilized. For example, random selection between the alternatives could be made, but wherein some alternatives are given a higher probability than others (e.g., according to a Gaussian or other distribution). Further, such random selection may be intentionally biased based on the occurrence of earlier events. For example, within the context of a computer game the randomization process might assign the probability that a "snow" event will be chosen as 0.5 if the user's previous actions had placed him or her in the mountains, but a probability of only 0.1 if the game were currently situated on the sea shore. Many alternative combinations are possible and have been contemplated by the instant inventor.

In order to prepare a work for use with the instant invention, it should be clear that the provider will preferably begin by assembling at least one base work, together with a number of different content segments for inclusion therein. For purposes of specificity in the text that follows, it will be assumed that a single such base work has been selected, although many variations are possible. For example, consider the case where two or more roughly parallel works are to be randomly "mixed" together (e.g., concert footage of the same musical group that has been recorded in two different cities). In such an instance, there could actually be two or more "base works", although for purposes of specificity herein, it will be assumed that one of the works has arbitrarily been selected to be the "base" work. As another example, consider the case where a writer has produced a script that specifically calls for two alternative endings. In this case, there is no obvious "base" work that would normally be played from start to finish. Thus, for purposes of clarity only, it will be assumed that one or the other endings, together with the remainder of the work, represents the base work. Finally, in some cases there may not be any particular pre-existing work or theme that can be readily identified as the base work (e.g., in the case of a video game which has multiple parallel and sequential branching alternatives and could consist entirely of alternative content segments as that term is used herein). In such a case—e.g., where there is no "original" work which is being varied, or where there is no portion of the work that is presented in every replaying—the term "base work" will be interpreted to include any arbitrarily chosen realization of the logic tree, i.e., any arbitrarily selected combination of the alternative content segments. Those of ordinary skill in the art will recognize that many variations of this theme are possible and well within the ability of such a person to design and implement.

The alternative content segments might take many forms, but typically they will be specifically selected and edited for the purpose described herein. It should also be noted that one of the content segments could certainly be taken from the base work, so that if it were randomly selected the base work would play as it was originally recorded. Beyond that, the editor will typically want to ensure that there is continuity in the overall work no matter which content segment has been inserted. Continuity here certainly implies at least continuity in the plot or theme of the movie/music/game work. Additionally, in the case of music it might be necessary to adjust the pitch or tempo of the alternative segment to allow it to blend seamlessly with the base work. In the case of movie footage, it might be desirable to adjust the volume, brightness, contrast, color saturation, aspect ratio, or any number of other variables related to the content segments so that they match more closely the base work. That being said, in other circumstances the producer might want to emphasize the fact that alternative content segments have been inserted and, in some cases, further enhance the differences between the substituted segments and the original work. Those skilled in the art will recognize that many such variations are possible and well within the skill of one who practices in this art.

As a next preferred step, a logic tree or a similar data structure will be prepared that will define at least the random components of the playback. For example, the logic tree would typically contain a listing of the locations within the base work at which randomization would take place. In the case of movies and video, the time-locations of the randomization points might be recorded as SMPTE time codes. In other applications such as music, the randomization points could be, for example, either time from the beginning of the work or a digital sample number (e.g., a randomization point might be defined to occur at the one-millionth digital sample of the work, no matter where in time that sample was processed). In the case of computer/video games, the randomization might be tied to "places" in the game (e.g., randomization occurs when the user reaches the "sea shore") or keyed to the occurrence of a specific event (e.g., randomization occurs after the "green dragon dies"). That being said, for purposes of specificity in the discussion herein, it will be assumed that the randomization points are specified in "time", although that term should be broadly construed to include any sort of marker within the base work.

Note that the information stored in the logic tree would typically be recorded onto any DVD or CD that is designed to implement the methods of the instant invention, although alternatives are certainly possible. For example, the DVD/CD might be sold to a user with the understanding that he or she would have to download an encrypted logic tree via the Internet, thereby ensuring that only authorized users could access the material stored on the DVD or CD.

Given the central/underlying work of choice, the assembled content segments will each be associated with a marker where they might be inserted into the work. Those segments that are suitable for insertion at the same time will typically be defined to be alternative content segments.

In summary, current DVD/CD/game technology provides content in a static, sequential format, and does not provide for the possibility of differing outcomes in content delivery. On the other hand, there is often excess content which has been edited from a work in advance of its publication. Such additional content can easily be incorporated into such a structure as has been suggested here, by making different cuts, recordings, etc., random alternatives in a playback scheme such as that described herein. By presenting random content segments to the end user, a movie, CD, or game is more likely to be viewed again, thereby providing the user with increased return on his or her entertainment dollar.

CONCLUSIONS

It should be noted at the outset that there are many variations in the invention disclosed herein that the instant inventor has specifically contemplated. As a first example, although it is preferable that each of the alternative content segments rejoin the underlying work at the same point in time (e.g., time point 220 of FIG. 3) in some situations, and to improve continuity from the user's perspective, it might be advantageous to do otherwise. A schematic illustration of this situation may be found in FIG. 8. In this figure, content segments B2 and B3 both rejoin segment C at the same point. However, segment B3 is designed to rejoin the main path some distance into segment C.

Additionally, it should be noted that, although the preferred embodiment discusses the use of alternative content segments that completely replace the corresponding matter in the original work, that need not always be the case. For example, in the case of a movie or video work, it might be only the accompanying musical score that is randomized. That is, the background music could be subject to randomization so that alternative musical selections are chosen to be played behind the same movie footage. Thus, each viewing of a particular scene might yield all or part of a new musical score that has been randomly selected. Most probably, the alternative music selections will be tied to specific scenes which, depending on the particular random selections, will impart a different mood, etc., to the work.

Further, and in another arrangement, in the case of movies or video, the alternative content segments might be colorized or non-colorized versions of the same work. That is, the same scene will be shown each time the work is played but the instant invention will randomly select either the colorized or non-colorized version for presentation to the user. Presumably, the base work will be a black-and-white film, although that is not essential. Additionally, the instant invention can be used to enhance the syndication value of previously broadcast weekly network shows such as situation comedies, dramas, etc., by including as alternative content segments scenes that were cut from the original broadcast, different versions of the broadcast scenes, etc.

In other variations, the alternative content segments of a musical work will be sung by different artists so that the user will potentially hear different artists perform each time the work is played. This same idea could be applied to movies and video, wherein the same scene is acted by a different actress or actor.

Note that, in the case of a computer game, the alternative content segments could be sections of computer code that are only executed if they have been randomly selected. Additionally, or in the alternative, graphical and database elements might also be included as part of the content segment, depending on the organization of the base computer game. Those of ordinary skill in the art will recognize that there are many such variations that could be implemented depending on the desires of the developer. Thus, for purposes of the instant disclosure, the term "computer instructions" should be interpreted in its broadest sense to include the instructions found within conventional computer programs, as well as the graphics and data base elements that might be used by the program to present its story to the end user/player.

Another area of applicability of the instant work lies in the field of education. For example, in the case where a student is viewing a base work which might consist, for example, of a historical documentary, the instant invention could periodically insert questions, based preferably on the previous few minutes of viewing, that tested the student's retention and understanding. At the randomization locations, a printed or oral question would preferably be laid over the base/assigned work, and the student given an option to answer the question in real time. Alternatively, the play back of the work could be stopped at each randomization point and the student queried. Certainly, many different variations of this configuration are possible and have been specifically contemplated by the instant inventor.

Additionally, although the instant invention preferably operates with parallel alternative content segments, it could also be used with sequential segments, if that were desired. That is, at a randomization point, rather than selecting a single segment to replace a portion of the base work, the algorithm might instead select a plurality of such content segments and play all of the selected segments, one after the other. This would, of course, create a random order of presentation which might be desirable in some settings.

Finally, it should be noted and remembered that, within the context of the instant disclosure the terms "view", "listen", "play", "experience", etc., are all interchangeable and should be interpreted in their broadest sense to include any exposure of a user to the work. That is, although a user typically "views" a movie and "listens" to a musical work, usage of one or the other of those terms should not be interpreted as excluding the other sort of experience. That is, in the claims that follow the term "view" should not be interpreted as excluding musical works or games, but instead given its broadest interpretation to include both of these other forms of entertainment. Similarly, "listen" should also include "viewing" (in the sense of movies and videos), "playing" (as in music and computer games), etc. For purposes of the claims that follow, the term "performing" will be used in its broadest sense to describe any sort of playback, including playback of movies, video, music, as well as computer games, etc.

Thus, it is apparent that there has been provided, in accordance with the instant invention, an apparatus and method of operation that fully satisfies the objects, aims and advantages set forth above. While the invention has been described in conjunction with specific embodiments thereof, it is evident that many alternatives, modifications and variations will be apparent to those skilled in the art and in light of the foregoing description. Accordingly, it is intended to embrace all such alternatives, modifications and variations as fall within the spirit of the appended claims.

What is claimed is:

1. A method for the presentation a work to a user, comprising the steps of:
   (a) obtaining a base work;
   (b) selecting at least one randomization position within said base work;
   (c) selecting, for at least one of said randomization positions, a plurality of alternative content segments associated therewith;
   (d) for any randomization position so selected, randomly selecting one of said plurality of alternative content segments associated therewith; and,
   (e) performing said base work and any alternative content segments so selected, said alternative content segments replacing at least a portion of said base work during said performance.

2. An apparatus for the presentation of a work to a user according to claim 1, wherein said base work and said alternative content segments are stored on a computer-readable medium positionable to be in electronic communication with said apparatus, comprising:
   (a) a microprocessor, said microprocessor being in electronic communication with said computer-readable medium, said microprocessor at least for processing information read from said computer-readable medium;
   (b) computer memory in electrical communication with said microprocessor, said computer memory containing at least a plurality of computer instructions defining the method of claim 1, said plurality of computer instructions for execution by said microprocessor;
   (c) an output interface, said output interface being in electrical communication with said microprocessor and receiving information therefrom for purposes of presenting said base work and said alternative content segments to the user according to said plurality of computer instructions executed by said microprocessor; and,
   (d) a display device in electrical communication with said output system, said display device for presenting said base work and any selected alternative content segments to the user.

3. An apparatus according to claim 2, wherein said computer memory is selected from a group consisting of RAM, ROM, EPROM, PROM, and flash RAM.

4. A method according to claim 1, wherein at least one of said alternative content segments is a content segment taken from said base work.

5. A method according to claim 1, wherein said base work is selected from the group consisting of a movie, a video recording, a musical work or a computer game.

6. A method according to claim 1, wherein step (e) comprises the step of displaying said base work and any alternative content segments so selected on a video display, said alternative content segments replacing at least a portion of said base work during said performance.

7. A method according to claim 1, wherein each of said alternative content segments contains a plurality of computer instructions therein, and wherein step (e) comprises the steps of
   (c1) executing an interactive computer program until one of said randomization positions is reached,
   (e2) executing any computer instructions contained within said selected alternative content segment associated with said reached randomization position.

8. A method according to claim 7, wherein said base work is a video game.

9. A method according to claim 1, wherein step (a) comprises the step of defining a base work.

10. A method for the presentation of a work to a user, wherein is provided
    a base work,
    a logic tree associated with said base work, said logic tree defining at least one randomization point within said base work, and,
    a plurality of alternative content segments for use with said base work and said logic tree, at least two of said plurality of alternative content segments being associated with said at least one randomization point
    comprising the steps of:
    (a) reading at least a portion of said base work;
    (b) reading at least a portion of said logic tree;
    (c) performing said base work for the user at least until said at least one randomization point is reached;
    (d) selecting randomly among said at least two alternative content segments associated with said randomization point;
    (e) reading said selected alternative content segment; and,
    (f) performing said selected alternative content segment for the user.

11. A method according to claim 10, wherein said base work is chosen from the group consisting of a movie, a video recording, a musical work or a computer game.

12. A method according to claim 10, wherein the step (a) comprises the step of reading said base work into computer RAM.

13. A method of preparing a work for presentation to a user, comprising the steps of
    (a) selecting a base work;
    (b) selecting at least one randomization position within said base work;
    (c) for each of said at least one selected randomization positions, selecting a plurality of alternative content segments associated therewith, wherein
       (c1) each of said selected alternative content segments is interchangeable at said randomization point
       (c2) each of said alternative content segments has a pointer associated therewith, and,
       (c3) each of said alternative content segments has a probability associated therewith;
    (d) storing within a logic free a marker representative of each of said selected randomization positions;
    (e) for each of said selected alternative content segments, storing said associated pointer and said associated probability within said logic tree, wherein each of said stored pointers and said stored probabilities is associated with a stored marker within said logic tree;
    (f) storing said base work in a first computer-readable medium;
    (g) storing said selected alternative content segments in a second computer-readable medium; and, (h) storing said logic tree in a third computer-readable medium, thereby preparing the work for presentation to the user.

14. A method of preparing a work for presentation to a user according to claim 13, wherein said first computer-readable medium, said second computer-readable medium, and said third computer-readable medium are all a same computer-readable medium.

15. A method of preparing a work for presentation to a user according to claim 13, comprising the further steps of:
   (i) reading said base work from said first computer-readable medium;
   (j) reading said alternative content segments from said second computer-readable medium;
   (k) reading said logic tree from said third computer-readable medium;
   (l) presenting said work to the user by:
      (l1) using said markers within said logic tree to determine said randomization positions,
      (l2) sequentially playing said work for the user,
      (l3) as each of said randomization points is reached, randomly selecting from among said alternative content segments associated with said reached randomization point according to said probabilities associated with each of said alternative content segments.
      (l4) playing for the user said randomly selected alternative content segment instead of a corresponding portion of said work, and,
      (l5) after said played alternative content segment has ended, continuing to play said work for the user until either a next randomization point is reached or an end of the work is reached.

16. A method according to claim 13, wherein said base work is selected from the group consisting of a movie, a video recording, a musical work or a computer game.

17. A method according to claim 13, wherein each of said probabilities associated with said alternative content segments of step (c3) is a same probability.

* * * * *